May 9, 1961     J. F. HYSLER     2,983,861
DUAL-MODE EXCITATION SYSTEM FOR EXCITER-EXCITED GENERATOR
Filed Oct. 7, 1958

INVENTOR
JOHN F. HYSLER
BY
James and Franklin
ATTORNEYS

United States Patent Office 2,983,861
Patented May 9, 1961

2,983,861
DUAL-MODE EXCITATION SYSTEM FOR EXCITER-EXCITED GENERATOR

John F. Hysler, Westport, Conn., assignor to Electric Regulator Corporation, Norwalk, Conn., a corporation of New York Filed Oct. 7, 1958, Ser. No. 765,776
12 Claims. (Cl. 322—28)

The present invention relates to a novel excitation system for an exciter-excited generator, said system being particularly adapted for use in an overall regulating system for the control of the voltage, current, or other output parameter of the generator. The term "generator," as here used, includes devices for producing either alternating or direct current, and the term "exciter," as here used, includes devices which produce either alternating or direct current.

The use of a separate exciter for energizing the field of a generator is quite common, particularly in connection with medium and large dynamoelectric machines. The exciter is commonly a rotary generator, usually but not necessarily of the direct current type, which is driven by the same prime mover as drives the generator. The use of an exciter does not completely eliminate the necessity for providing an initial source of excitation, but only removes that need one step from the generator, since the field of the exciter must itself be energized. However, the problems involved in providing excitation for the exciter field are usually much simpler and much more readily satisfied than when the field of a medium or large size generator must be directly excited.

There are in general three different sources from which the excitation for the exciter field may be derived, to wit, (a) the exciter itself, (b) any available bus or external source of electricity and (c) the output of the generator itself. The use of each of these sources has advantages and disadvantages, particularly when, as is usually the case, some means is provided for varying the excitation of the exciter field in order to control the output of the generator. This means may be employed to vary that output within limits, or it may comprise an automatic regulation system designed to maintain constant one or more selected parameters of the output of the generator, such as current or voltage, despite wide variations in load conditions or the like.

When the exciter field is energized by the exciter itself (self-excited exciter operation) the system is simple and inexpensive, the control power required is small, and the system is relatively trouble-free. Quite frequently, however, stability considerations militate against the use of this system. For example, if the points on the exciter saturation curve corresponding to generator no load and full load conditions fall essentially on a straight line, the system is unstable if an attempt is made to vary the exciter field excitation manually, as through the use of a rheostat in series with the exciter field, in order to vary the output of the generator. Even when a carefully designed regulating system defining a closed servo loop is employed, stability remains a serious problem, and in order to achieve stability it is usually necessary to sacrifice either accuracy of regulation or response time. Moreover, when a generator suddenly requires high excitation, as when an overload is applied suddenly from an initial no-load state, very little voltage is immediately available from the exciter to increase its own field current, and hence an appreciable period of time is required before the system will build up to the necessary high excitation state.

When the exciter field is energized from an external source of electricity (bus-excited operation) the system is always stable when manually controlled and a high forcing voltage is always available from the bus connected to the external source to meet sudden load requirements, thus greatly reducing the period of time necessary for the system to build up to a high excitation state. The primary disadvantage of the bus-excited system is that satisfactory external sources of electricity are seldom available. Thus the bus-excited system, while theoretically desirable, is from a practical point of view often entirely impractical. Moreover, even when an appropriate external source is available, high control power is required, thus adding to the initial cost and cost of operation of the system, since the various circuit components must be sufficiently large to carry the high control power.

To overcome the primary disadvantage of the bus-excited system, it has been proposed to excite the exciter from the output of the generator itself. (This may be considered a species of bus-excitation, in which the bus is powered by the generator.) This eliminates the need for an external source of power, but high control power is still required, with its attendant disadvantages. Moreover, with generator-excitation it is unlikely that the machine will build up without auxiliary switching equipment and batteries, the system may collapse when transients occur, and the system will collapse if the output of the alternator is short circuited.

The system of the present invention is designed to overcome the disadvantages of the previously proposed excitation systems discussed above. It provides for excitation of the exciter field both from the bus (either an outside source or the generator itself) and from the exciter itself. The bus voltage which provides the excitation must be alternating in character. The two modes of excitation are simultaneously available and are rendered alternatively operatively effective on each half cycle of the alternating bus voltage. On one-half cycle, when the bus voltage is positive, the exciter field will be energized from the bus voltage. On the next succeeding half cycle, when the bus voltage is negative, the exciter field will be energized from the exciter output. The changeover between bus-mode excitation and self-mode excitation is accomplished without any moving parts, and in an entirely reliable and effective maner. As a result the regulating system produces a much faster response, exhibits improved stability, will not collapse on short circuits, and will always build up.

To accomplish these results the voltage output from the exciter and the voltage output of the bus are connected in parallel with one another and to the exciter field, and means such as rectifiers are provided to ensure that current can flow through each of these parallel circuits only in one direction, that direction in each case providing for building up the output of the exciter field. The bus voltage, whether from an external A.C. source or from an alternator excited by the exciter, will normally be higher than the exciter voltage. Hence when the alternating bus voltage is positive in sense (its polarity is such as to cause current to pass through the rectifier) substantially all of the energization of the exciter field will be derived from the bus voltage. On the next half cycle of the alternating bus voltage, however, the rectifier in the bus-energized circuit will prevent current flow, and consequently the exciter itself will provide the energizing current for the exciter field. Hence bus-mode excitation is always available for the small excitation changes needed in the high gain region of the exciter's saturation curve and is always available for forcing the exciter field when fast response is required. Self-mode excitation is always available to ensure that the system will build up upon starting and to prevent collapse of the system when transients occur or if the output of the generator is short circuited. In addition, there is no possibility of exciter polarity reversal.

It has further been found that by thus rapidly alternately exciting the exiter field from two separate sources an effect is produced akin to that of a magnetic amplifier. The passage through the exciter field winding of the current of one of the energizing sources sets up within that field and its associated magnetizable material a magnetic condition which tends to persist during excitation by the other energizing source, and hence the amount of current drawn from each energizing source is to a surprisingly large degree controlled by the amount of current supplied by the other energizing source. In other words, the exciter field winding acts like a magnetic amplifier or saturable reactor having but a single winding which alternately functions as the control winding and the power winding.

Advantage may be taken of this phenomenon to permit the control and regulation of much greater energizing currents than has heretofore been practical by a given control unit. The regulating resistor, the magnitude of which may be controlled in accordance with a selected sensed parameter of the generator output, may be placed in series with only one of the field-energizing circuits, e.g. the circuit connected to the output of the exciter. By thus controlling the magnitude of the excitation derived from the exciter, control is also effected over the magnitude of the current derived from the bus, yet the bus current need not pass through that resistor. Consequently the power carrying capacity of the resistor can be very low. Where the resistor is in the form of a finger type regulator such as that disclosed in Cohen Patent 2,580,- 732 of January 1, 1952, in which type of device contacts are opened and closed in order to control the overall magnitude of the effective regulating resistance, this effect is particularly valuable, since the contacts need carry much less current than would be the case if all of the energizing current had to pass therethrough. This lessened current more than doubles the effective rating of the actual regulatory unit.

To the accomplishment of the above and to such other objects as may hereinafter appear, the present invention relates to a system for providing and controlling the excitation of the exciter field of an exciter-excited generator, as defined in the appended claims and as described in this specification, taken together with the accompanying drawings, in which:

Figure 1:
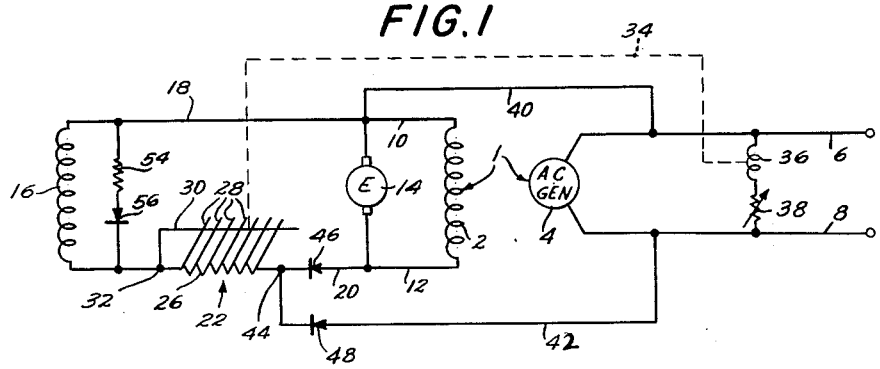
Fig. 1 is a circuit diagram illustrating one manner in which the instant invention may be accomplished, the energizing currents from both the exciter and the bus passing through the regulatory resistance.

A generator generally designated 1 is provided with a field winding 2 and an armature 4, the electrical output from the armature being carried by lines 6 and 8. The generator output may be either of the direct or alternating type, but it is here disclosed as of the alternating type. The generator field winding 2 is connected by lines 10 and 12 to the armature 14 of an exciter which has a field winding 16. The output of the exciter armature 14 as here disclosed is D.C. The exciter field winding 16 is connected to one side of the exciter armature 14 by line 18 and is connected to the other side of the exciter armature 14 by line 20. Positioned in one of these lines, and here shown as the line 20, is a regulatory resistance generally designated 22 and here shown in the form of a resistor 26 having conductive fingers 28 connected to selected points therealong and engageable with a shorting bar 30 connected to the line 20 at point 32. The effective value of the resistance 22 will therefore be controlled by the sequential connecting and disconnecting of the fingers 28 with the shorting bar 30. The broken line 34 represents an operative actuating connection between the fingers 28 and an electromagnetic coil 36, which is here shown as connected across the lines 6 and 8, in series with a variable resistor 38, in order to sense and regulate the voltage output of the generator 1. The elements 22–38 can form part of a finger type regulator such as that disclosed in the aforementioned Cohen Patent 2,580,732. It will be understood that if some characteristic of the generator output other than voltage is to be sensed, the electromagnetic coil 36 would be differently connected to the generator output circuit 6, 8.

The system as thus far described embodies self-mode excitation of the exciter field 16, and provides for regulation thereof in accordance with a selected sensed parameter of the generator output, such as voltage, in conventional fashion.

In order to provide for bus-mode excitation (the bus as specifically illustrated being the A.C. output from the generator armature 4), the lines 6 and 18 are connected by line 40, and the lines 8 and 20 are connected by the line 42, the latter meeting line 20 at point 44 in Fig. 1. A rectifier 46 is provided in the line 20 between the point 44 and the exciter armature 14, and a rectifier 48 is provided in the line 42 between the point 44 and the line 8. Both of these rectifiers are so oriented as to permit flow through their respective circuits (the rectifier 46 being in the self-mode energization circuit and the rectifier 48 being in the bus-mode energization circuit) in the same direction, and in that direction which will cause a build up of the field produced by the exciter field winding 16.

The bus voltage across the lines 6 and 8 will be greater than the exciter voltage across the lines 10 and 12. Moreover, the bus voltage will be alternating in character. When the generator is, as here specifically disclosed, an alternator producing alternating voltage, the generator output lines and the bus lines may be one and the same. When a D.C. generator is involved in the system an outside source of A.C. must be available having a voltage greater than that of the exciter voltage, and such an external bus source could be employed, if desired, even when the generator is in the form of an alternator.

Figure 3:
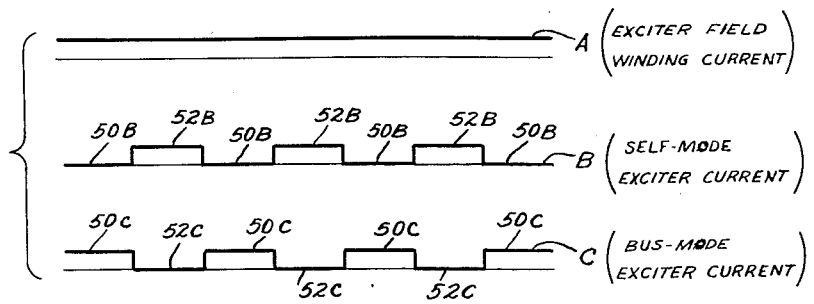
Fig. 3 is a graphical representation of the manner in which the systems of Figs. 1 and 2 function.

The manner in which the described system functions can best be appreciated from Fig. 3, in which curve A is a graphical representation of the energizing current passing through the exciter field winding 16, curve B is a graphical representation of the current in the self-mode energization circuit including the exciter armature 14 and the rectifier 46, and curve C is a graphical representation of the current in the bus-mode energization circuit including the lines 6 and 8 and the rectifier 48. During that half cycle of the A.C. bus voltage in which the polarity is such as to cause current to pass through the rectifier 48 (which is the first half cycle illustrated in Fig. 3), current will be provided to the exciter field 16 from the bus 6, 8 (curve portions 50C of Fig. 3), and since the voltage of the bus is greater than the voltage of the exciter armature 14 connected in parallel therewith via the now blocking rectifier 46, the exciter armature will supply substantialy no energizing current (curve portions 50B of Fig. 3). Thus the magnitude of the current passing through the exciter winding 16 will, as indicated by curve A, have a magnitude substantially equal to that of the current supplied from the bus 50C. The rectifier 46 in the self-mode energization circuit prevents any reversed feeding of bus-derived current through the exciter armature 14 or the generator field 2.

On the next half cycle of the A.C. bus voltage it will be polarized in a manner opposed to the rectifier 48, and consequently no current will pass through the bus mode energizing circuit (curve portions 52C). Hence there will be no voltage opposing the self-mode energization circuit, and the exciter armature 14 will provide current to the exciter winding 16 (curve portions 52B). Despite the difference between the bus voltage and the exciter armature output voltage, the magnitude of the two currents represented by the curve portions 50C and 52B will be substantially the same, in part because the differences in their voltages need not be very great and also because each current 50C and 52B sets up a certain magnetic condition in the exciter field which, when compared with the short time between alternate half cycles of the A.C. bus voltage, tends to remain constant and thus gives rise to a magnetic amplifier or saturable reactor effect in which each current tends to control the magnitude of the other. Accordingly, as may be seen from curve A of Fig. 3, the energizing current in the exciter field winding 16 remains substantially constant despite the fact that it is alternately energized on each half cycle on the A.C. bus voltage first from the bus and from the exciter.

Any changes in the sensed parameter of the generator output are translated into changes of the effective value of the resistance 22, and this in turn, in conventional manner, alters the excitation of the exciter field 16 in such a sense as to maintain that output parameter constant.

Figure 2:
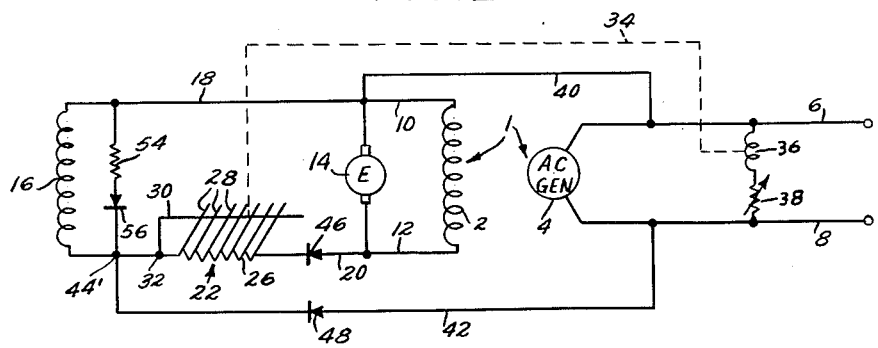
Fig. 2 is an alternative embodiment in which only the exciting current derived from the exciter passes through the regulatory resistance.

In Fig. 1 the point 44 where the line 42 from the bus source of excitation connects with the line 20 is located between the exciter armature 14 and the resistor 22. As a result all of the current energizing the exciter winding 16 passes through the resistor 22 and hence through one or more of the fingers 28 and between those fingers and the shorting bar 30. As is well known, a given regulating device of the type involved is limited to the carrying of a predetermined amount of power, and hence a given instrumentality can only be used to regulate an exciter the field winding of which takes less than that predetermined amount of power. In Fig. 2 the line 42 is connected to the line 20 at point 44', which is located on the other side of the resistor 22 from the point 44 when compared with Fig. 1, that is to say, between the resistor 22 and the exciter winding 16. Consequently the current provided to the exciter winding 16 from the bus 6, 8 will not pass through the regulating resistor 22. Nevertheless, because of the magnetic amplifier or saturable reactor effect previously mentioned, regulation will still be effected. The magnitude of the bus-supplied current becomes a slave to the magnitude of the exciter-supplied current, and regulation only of the exciter-supplied current (the resistor 22 being only in the self-mode energization circuit in Fig. 2) also serves to effectively regulate the bus-mode energization circuit. With the system of Fig. 2, however, only half of the power supplied to the exciter winding 16 is effective on the resistor 22. Consequently, for a regulating instrumentality having a given power rating, the system of Fig. 2 permits its safe use in applications where the actual power supplied is approximately double that rating. In addition, connection of the line 42 to the point 44' results in a higher maximum availability of exciter excitation, thus giving rise to faster response than with the source disclosed in Fig. 1.

It has been found advantageous to connect across the exciter winding 16 a resistor 54 and a rectifier 56 in series, this network providing a shunt path for high transient voltages which might be produced in the exciter winding 16, for example, by sudden unloading of the generator 4. The shunt path provided by the resistor 54 and rectifier 56 prevents these voltages from being applied across the regulator fingers 38 and shorting bar 30, where that might cause severe arcing.

The use of the system of the present invention has given rise to dramatically improved control of exciter-excited generator systems. For example, in voltage regulation of a 50 kva. 60 cycle diesel engine generator with a rotating exciter, with conventional self-excitation, and using a finger-type regulator such as is shown in Cohen Patent 2,580,732, the application of load caused a drop in output voltage which persisted for .5 second, and a sudden removal of load caused a sharp increase in voltage and subsequent voltage oscillations which continued for approximately 2 seconds. With the dual-mode excitation system of Fig. 1 the voltage drop when load was applied was about 20% less and lasted for only .3 second. Removal of load resulted in an increase in voltage which decayed in less than .2 second and without any oscillation or hunting. This type of performance was formerly impossible to obtain except with very large, complicated, expensive and undependable regulating equipment.

The system of the present invention (apart from its conventional regulatory elements) requires no maintenance, since no moving parts are involved. Proper loading of the units should result in practically unlimited life. The only appreciable added expense involved resides in the cost of the rectifiers 46 and 48, and the resistor 54 and rectifier 56 if utilized.

While only two embodiments of the present invention have been here specifically disclosed, it will be apparent that many variations may be made therein, all within the spirit of the invention as defined in the following claims.

I claim:

1. In combinaiton with a generator having a field excited by an exciter, said exciter having a field; an electrical source other than said exciter, said source providing an alternating voltage output, means for exciting said exciter field from the voltage of said source during alternate half cycles of the output of said source, and means for exciting said exciter field from said exciter during the other alternate half cycles of said source.

2. In the combination of claim 1, means for directly controlling at least one of said exciting means in accordance with the magnitude of a predetermined parameter of the output of said generator.

3. In combination with an alternator having a field excited by an exciter, said exciter having a field; means for exciting said exciter field from the voltage output of said alternator during alternate half cycles of the output of said alternator, and means for exciting said exciter field from said exciter during the other alternate half cycles of the output of said alternator.

4. In the combination of claim 3, means for directly controlling at least one of said exciting means in accordance with the magnitude of a predetermined parameter of the output of said alternator.

5. In combination, a generator having a field, an exciter having an output operatively connected to said generator field for energizing the latter, a field for said exciter, first electrical connections between said exciter output and said exciter field for energizing the latter from the former and including first means effective to permit current flow only in one direction between said exciter output and said exciter field, an electrical source other than said exciter, said source providing an alternating voltage output, and second electrical connections between said source and said exciter field for energizing the latter from the voltage of the former including second means effective to permit current flow only in one direction between said source and said exciter field, said first and second means permitting current flow through said exciter field in the same direction, one end of said second electrical connection being connected to said exciter field at a point between said first means and said exciter field, whereby said exciter field is excited respectively by said exciter and by said source during alternate half cycles of the output of said source.

6. In the combination of claim 5, a variable resistance connected to the exciter field and effective to control the energization thereof.

7. The combination of claim 6, in which said variable resistance is located between said point and said exciter field.

8. The combination of claim 6, in which said exciter field is on one side of said point and said variable resistance is on the other side thereof.

9. In combination, an alternator having a field and an output, an exciter having an output operatively connected to said alternator field for energizing the latter, a field for said exciter, first electrical connections between said exciter output and said exciter field for energizing the latter from the former including first means effective to permit current flow only in one direction between said exciter output and said exciter field, and second electrical connections between said alternator output and said exciter field for energizing the latter from the voltage of the former and including second means effective to permit current flow only in one direction between said alternator output and said exciter field, said first and second means permitting current flow through said exciter field in the same direction, one end of said second electrical connection being connected to said exciter field at a point between said first means and said exciter field, whereby said exciter field is excited respectively by said exciter and by said alternator on alternate half cycles of the output of said alternator.

10. In the combination of claim 9, a variable resistance connected to the exciter field and effective to control the energization thereof.

11. The combination of claim 10, in which said variable resistance is located between said point and said exciter field.

12. The combination of claim 10, in which said exciter field is on one side of said point and said variable resistance is on the other side thereof.

No references cited.